May 5, 1959 R. GUYER 2,885,140
FROZEN POULTRY CONTAINER
Filed Feb. 21, 1956 2 Sheets-Sheet 1

INVENTOR
Reynolds Guyer
BY
ATTORNEY

May 5, 1959 R. GUYER 2,885,140
FROZEN POULTRY CONTAINER
Filed Feb. 21, 1956 2 Sheets-Sheet 2

INVENTOR
Reynolds Guyer
BY
ATTORNEY

United States Patent Office 2,885,140
Patented May 5, 1959

2,885,140

FROZEN POULTRY CONTAINER

Reynolds Guyer, White Bear Lake, Minn., assignor to Waldorf Paper Products Company, St. Paul, Minn., a corporation of Minnesota Application February 21, 1956, Serial No. 566,818

9 Claims. (Cl. 229—39)

This invention relates to an improvement in frozen poultry containers and deals particularly with a container in which poultry may be frozen, stored and shipped.

The freezing of turkeys, chickens and the like has become increasingly popular in recent years. In some instances the fowl has been placed in a plastic bag, frozen and then placed in a suitable outer container for storage and shipment. In other words, the poultry has been placed in telescoping containers which may be opened during the freezing process and subsequently closed for storing and shipment.

The first of the foregoing methods has the disadvantage of requiring the handling of the poultry in a frozen state at which time the birds are frozen in a particular shape and, therefore, do not fit together properly during shipment and requiring additional space.

The second method mentioned above has the disadvantage of requiring more time for the freezing operation. The air circulation through a tray-shaped container is limited and more time is required to freeze the birds.

An object of the present invention lies in the provision of a container having ends which may be opened up to expose the contents and at the same time to permit a free circulation of air through the container. After the birds have been frozen, the ends may be closed for storage and shipment.

One of the primary requirements of containers of the type in question is high stacking strength. Turkeys and chickens are heavy and when the containers are piled one upon the other there is a very considerable weight on the lowermost containers. This fact, coupled with the fact that the containers are often subjected to dampness due to the moisture content of the fowl, particularly before the freezing operation, provides a tendency for the containers to collapse when subjected to compression. This moisture has a deleterious effect upon the containers and tends to soften the board. Thus it is necessary to have containers which are highly resistant to crushing, as the crushing action tends to mar or injure the quality of the poultry.

A feature of the present invention resides in the provision of a container having corner posts which greatly strengthen the containers and prevent them from crushing. These corner posts are produced by folding portions of the container inwardly to form a generally triangular corner structure. These corner posts are held in proper form by reinforcing strips which are cut from the ends of the container and are folded to provide locks holding the corner posts assembled. Thus the locks form the end openings in the container to provide the desired air circulation.

A further feature of the present invention lies in the provision of a container having end flaps which are hingedly connected to cover flange portions which may fold with the end flaps. As a result, portions of the top of each container may be folded with the end flaps during the freezing operation thereby providing a simple means of inspecting the birds and exposing more of the birds to the free action of the ambient air.

An important requirement of containers of the type in question is that they be so formed that they can be set up at the freezing plant without unusual equipment. Apparatus such as stitching machines are not always readily available at cold storage plants and adhesive tape is often difficult to apply and to keep sealed under the conditions found in such plants. Accordingly, it is a feature of the present invention that the box may be set up from flat folded condition to freezing position and to storage position without the use of securing means such as wire staples or tape.

These and other objects and novel features of my invention will be more clearly and fully set forth in the following specification and claims.

In the drawings forming a part of the specification:

Figure 1:
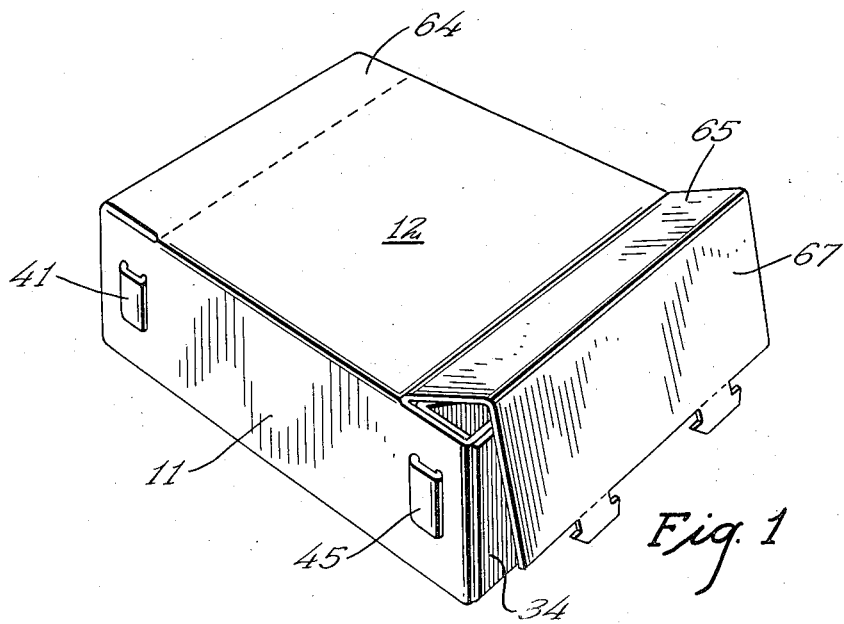
Figure 1 is a perspective view of the container with one end closed and the other end partially closed showing the construction thereof.
Figure 2:
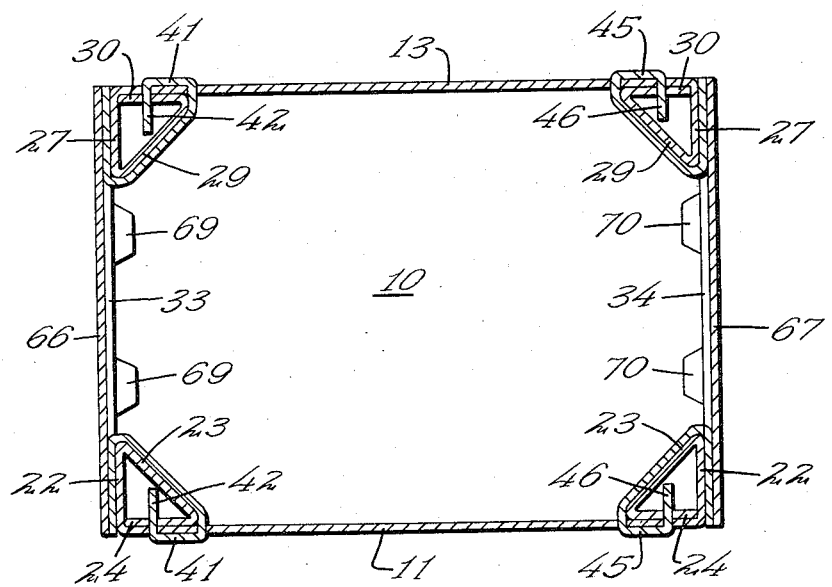
Figure 2 is a sectional view horizontally through the container shown in Figure 1.

The container is indicated in general by the letter A and includes a bottom panel 10, a wall panel 11, a top panel 12, and a wall panel 13, which panels are foldably connected along parallel fold lines 14, 15 and 16. A stitching flap 17 is foldably connected to the panel 10 along a parallel fold line 19. This flap 17 is normally stitched in overlapping relation with the wall panel 13 at the point of manufacture of the container to form a tubular structure which may be folded into a flat folded state for shipping and storage.

The wall panel 11 is foldably connected along parallel fold lines 20 and 21 intersecting the fold lines 14 and 15 at right angles to a series of short flaps 22, 23 and 24 which are separated by fold lines 25 and 26. These three panels 22, 23 and 24 are foldable to provide a triangular post at each end of the wall panel 11, the flaps 22 extending at right angles to the wall panel 11, the panels 24 lying in surface contact with the wall panel 11 and the flaps 23 extending diagonally across the corner thus formed. The means of holding these posts in triangular form will be later described.

The wall panel 13 is similarly connected along extensions of the fold lines 20 and 21 to a series of three flaps 27, 29 and 30 which are connected along fold lines 31 and 32. These flaps may be formed into triangular posts with the flaps 27 extending at right angles to the panel 13, the flaps 30 lying in surface contact with the panel 13, and the intermediate flaps 29 extending diagonally across these corners. The bottom panel 10 is foldably connected along extensions of the fold lines 20 and 21 to end flaps 33 and 34. Slots 35 and 36 are provided adjoining the junctures between the panel 10 and the end flaps 33 and 34 to accommodate locking tongues to hold the container closed, as will be later described. The slots are preferably defined by shallow U-shaped cut lines extending into the end flaps 33 and 34 so as to provide open slots near the bottom edges of the end flaps when these end flaps are erected. The end portions 37 and 39 of the end flaps 33 and 34 extend the full height of the side walls 11 and 13 so as to increase the stacking strength of the container at the corners thereof. These end portions 37 and 39 are hingedly connected to locking strips to be used in holding the corner posts erected. The end portions 37 of the flap 33 are connected along parallel fold lines 40 to locking strips 41 having enlarged locking ends 42 and having a pair of parallel fold lines 43 intermediate their ends. The end portions 39 of the end flap 34 is connected along parallel fold lines 44 to locking strips 45 having enlarged locking ends 46 and having a pair of parallel fold lines 47 intermediate their ends. The fold lines 43 and 47 act to divide the locking strips into three portions for a purpose which will be described.

The side wall panel 11 is provided near the fold line 20 with a pair of elongated slots 49 and 50 which extend parallel to the fold line. The opposite end of the panel 11 is provided with a pair of similar slots 51 and 52. Slots 53 and 54 are provided parallel to and adjacent the fold line 20 in the wall panel 13. Similar slots 55 and 56 are provided in panel 13 near the other end thereof. The flaps 24 are provided with a similar slot 57 while the flaps 30 are also provided with a similar elongated slot 59.

The locking strips are separated from the end flaps to which they are secured by cut lines 60 and 61 extending parallel to the fold lines 20 and 21 respectively. Thus the strips extend toward the centers of the end flaps in flat condition of the blank.

The top panel 12 is provided with a pair of fold lines 62 and 63 spaced inwardly from the fold lines 20 and 21 and these fold lines define cover flap portions 64 and 65 which are separated at their ends from the adjoining wall panels 11 and 13. The cover panel 12 is foldably connected along extensions of the fold line 20 and 21 to end closing flaps 66 and 67. Locking tongues 69 and 70 project from the edges of the flaps 66 and 67 and are foldably connected thereto along short lines of fold 71 and 72.

The container is set up in the manner which will now be described. The containers are already in flattened tubular form and the first step of the setting up operation is to fold the wall panels 11 and 13 into right angular relation with the bottom and top panels 10 and 12. The corner post forming flaps are next folded successively into triangular form. In this position the slots 57 of the flaps 24 fold into registration with the outermost flaps 49 and 51 of the wall panel 11. Also in this position the flaps 50 and 52 are just inwardly of the innermost edge of the corresponding corner posts. To lock one such corner post in erected position a strip 41 is folded around the corner post to lie inwardly of the diagonal flap 23. The strip 41 extends through the slot 50 and is folded so that the portion of the strip between the fold lines 43 overlies the outer surface of the wall panel 11. The locking end 42 of this strip is inserted through the registering slots 49 and 57, the enlarged ends resisting outward movement of this portion of the strip when once in place. In a similar way the other strip 41 may fold about a corner post including flaps 27, 29 and 30, the strip extending through the slot 54 of the panel 13, overlying a portion of the outer surface of the panel 13 and extending through the aligned slots 53 and 59. One strip 45 encircles the corner posts made of the flaps 22, 23 and 24, extends through the slot 52 in the wall panel 11 and locks through the aligned apertures 51 and 57. The second strip 45 extends about a corner post made up of flaps 27, 29 and 30, extends through the slot 56 and locks through the aligned slots 55 and 59.

Figure 3:
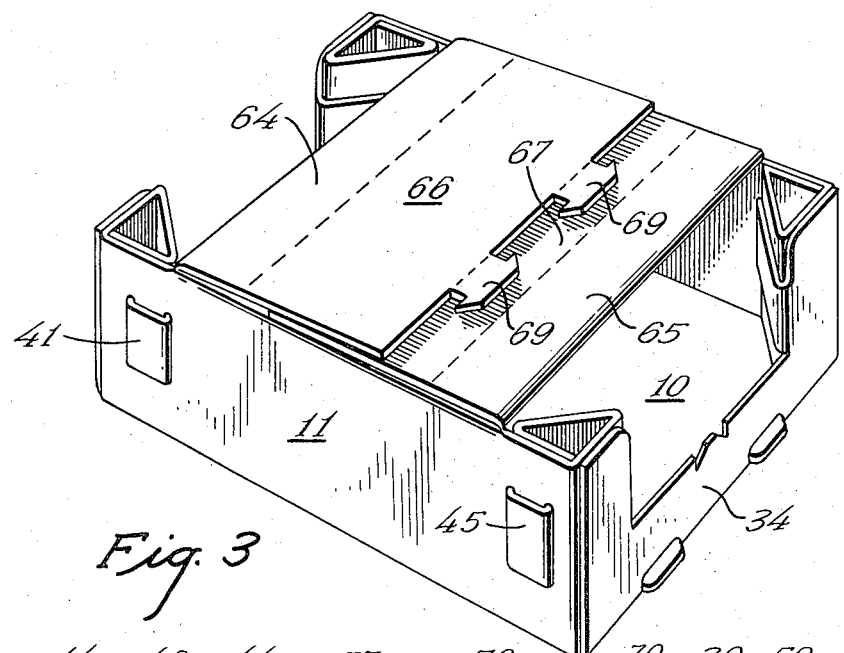
Figure 3 is a perspective view of the opened container in readiness for the freezing operation.
Figure 4:
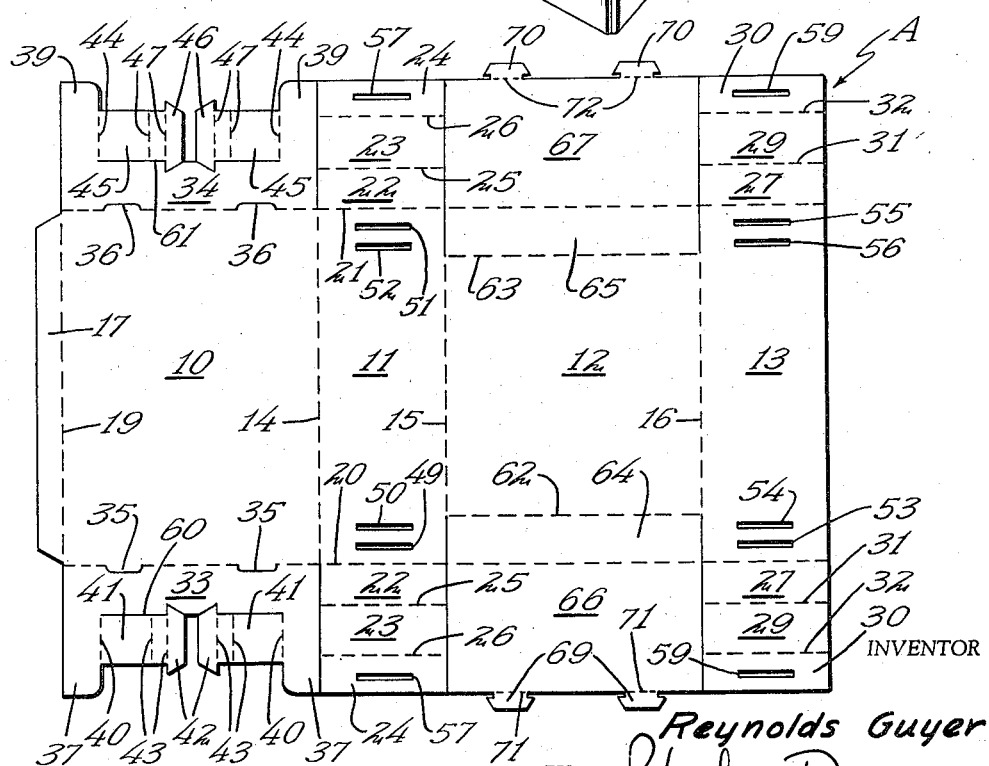
Figure 4 is a diagrammatical view of the blank from which the container is formed.

During the freezing operation the cover flaps 64 and 65 with the closing flaps 66 and 67 connected thereto may fold back over the intermediate portion of the cover panel 12 as is indicated in Figure 3 of the drawings. The greater part of the area of the ends of the containers are, accordingly, open to provide for a free circulation of air. Furthermore, a sufficient portion of the top panel is folded back to permit inspection of the contents and to expose a greater portion of the contents.

When it is desired to close the container, this may be accomplished by folding the cover flaps 64 and 65 over the corner posts and folding the closing flaps 66 and 67 down to close the ends of the container. The locking flaps 69 are inserted through the slots 35 and the locking tabs 70 are inserted through the slots 36. The container is then closed and may be stored or shipped in this state.

It will be seen that no metal stitches or adhesive tape is required for holding the container in an erect form. It will also be obvious that the ends of the container may be open permitting a free circulation of air when desired and may be later closed for storage and shipment. The container possesses a high degree of stacking strength and will stand up under very considerable compressive loads.

In accordance with the patent statutes, I have described the principles of construction and operation of my frozen poultry containers, and while I have endeavored to set forth the best embodiment thereof, I desire to have it understood that changes may be made within the scope of the following claims without departing from the spirit of my invention.

I claim:

1. A container including a pair of side walls, a top wall and a bottom wall connected in tubular relation, flaps on the ends of said walls, the flaps connected to said side walls being divided by parallel fold lines into three panels arranged in a series, said last named panels being folded in triangular relation to form triangular posts extending between said top wall and said bottom wall, means on the flaps connected to said bottom wall for holding said corner posts in folded relation.

2. The construction of claim 1 in which the flaps secured to the top wall comprises a closing flap, and including top panel portions forming the ends of said top wall overlying said triangular posts connected to the remainder of the top wall along parallel fold lines, said top panel portions forming the portions of the top wall to which the said closing flaps are hinged and being separated from said side walls by cut lines.

3. A container including a tubular body including side walls, a top wall, and a bottom wall, said walls being connected along parallel lines of fold, flaps secured to all of said walls, the flaps secured to said side walls being divided along fold lines parallel to the fold lines connecting these flaps to the side walls into three flap portions, said flap portions being folded into triangular relation with the intermediate flap portion extending diagonally across a corner of the container to provide a triangular corner posts between the top and bottom walls, the flap connected to said bottom wall having a pair of strips cut therefrom and folded to lie inwardly of said diagonally extending flap portions, said strips extending through apertures in said side walls and having their extremities extending through aligned apertures in said side walls and one of said strip portions.

4. A container including a pair of side walls, a top wall and a bottom wall hingedly connected along parallel fold lines in tubular relation, flaps hingedly secured to the ends of said walls, the flaps secured to said side walls being divided by fold lines parallel to the fold lines connecting these flaps to the side walls into three flap portions, the first flap portion of each of these flaps being folded into right angular relation to the side wall to which it is hinged, the intermediate flap portion extending diagonally toward the side wall to which it is hingedly connected and the third flap portion extending in surface contact with the side wall to which it is hinged, the flap secured to said bottom wall having strips cut therefrom in opposed relation, said strips being folded to lie inwardly of the diagonally extending portions of said flaps connected to said side walls, said side walls having spaced slots therein adjoining each corner post, said strips extending through one such slot, overlying the outer surface of the side wall, and having an extremity extending through the other of said slots and through the flap portion lying inwardly in surface contact therewith.

5. The construction described in claim 4 and including top flaps forming a part of said top wall and foldably connected to the remainder of the top wall along parallel fold lines, said top flaps being hingedly connected to the flaps secured to the top wall and being separated at their ends from said side walls.

6. A container including a pair of side walls, a top wall and a bottom wall connected in tubular relation, flaps on the ends of said side walls, the flaps connected to said side walls being divided by parallel fold lines into three panels arranged in a series, said last named panels being folded in triangular relation to form triangular posts extending betwen said top wall and said bottom wall, means on the flap connected to said bottom wall for holding said corner posts in folded relation, said means for holding said corner posts folded includes strip means cut from the flap connected to said bottom wall.

7. A container including a pair of side walls, a top wall and a bottom wall connected in tubular relation, flaps on the ends of said side walls creased and folded to provide triangular posts at the ends of the side walls, end panels on said ends of bottom wall folded upwardly from said bottom panel, the portions of said end panels between said corner posts terminating along a line spaced substantially below said top wall, said triangular posts extending from the upper surface of said bottom wall to the under surface of said top wall, score lines extending across said top panel spaced from, and parallel to the ends of said top wall inwardly of said posts, slits extending along the fold lines connecting the top wall to the side walls from the ends of said top wall to said score lines to define top panel portions foldable out of the plane of the remainder of the top wall and end closure flaps foldably connected to the ends of said top panel, whereby said corner posts may serve as a support to resist compression both when said end closure flaps on said top wall are in end closing position and when said top panel portions and said end closure flaps connected thereto are folded to overlie the center portion of said top panel between said score lines.

8. The structure of claim 7 and including means for locking said end closure flaps on said cover panel in end closing position.

9. A container including a pair of side walls, a top wall and a bottom wall connected in tubular relation, flaps on the ends of said walls, the flaps connected to said side walls being divided by parallel fold lines into three panels arranged in a series, said last named panels being folded in triangular relation to form triangular posts extending between said top wall and said bottom wall, means on the flaps connected to said bottom wall for holding said corner posts in folded relation, the flap connected to said top wall forming a closing flap, and means on said closing flap for locking said closing flap in closing relation.

References Cited in the file of this patent
UNITED STATES PATENTS

| | | |
|---|---|---|
| 1,653,116 | Parks | Dec. 20, 1927 |
| 2,074,090 | Loth | Mar. 16, 1937 |
| 2,306,328 | Biberthaler | Dec. 22, 1942 |
| 2,333,244 | Gordon | Nov. 2, 1943 |
| 2,349,364 | Marshall | May 23, 1944 |
| 2,705,588 | Huckstep | Apr. 5, 1955 |